United States Patent [19] [11] 4,280,040
Gilkison [45] Jul. 21, 1981

[54] METHOD OF ARC WELDING POROUS SHEET METAL

[75] Inventor: John J. Gilkison, Nelson, England

[73] Assignee: Rolls-Royce Limited, London, England

[21] Appl. No.: 22,838

[22] Filed: Mar. 22, 1979

[30] Foreign Application Priority Data

May 20, 1978 [GB] United Kingdom ............... 20952/78

[51] Int. Cl.³ ............................................... B23K 9/02
[52] U.S. Cl. ..................................... 219/104; 219/61; 219/66; 219/137 R
[58] Field of Search ..................... 219/59.1, 60 R, 61, 219/118, 66, 137 R, 104

[56] References Cited

U.S. PATENT DOCUMENTS

| 1,655,931 | 1/1928 | Langstroth | 219/137 R |
| 3,223,816 | 12/1965 | Marsden | 219/61 |
| 3,319,043 | 5/1967 | Rohrberg | 219/104 X |
| 3,748,429 | 7/1973 | Agusa | 219/137 R X |
| 3,860,777 | 1/1975 | Sawhill | 219/61 |
| 4,038,514 | 7/1977 | Ashton | 219/137 R |
| 4,152,568 | 5/1979 | Yamaguchi | 219/59.1 |

Primary Examiner—E. A. Goldberg
Attorney, Agent, or Firm—Cushman, Darby & Cushman

[57] ABSTRACT

A method for manufacturing a gas turbine combustion chamber that preserves cooling fluid holes therein. Passages are formed in one surface of each of two metal sheets. A plurality of cooling fluid holes are drilled through the passages to the other surface of each sheet. The two metal sheets are abutted face-to-face so that their respective passages form channels and the sheets are thereafter brazed together. The brazed sheets are bent to form an annular shaped chamber having a butt joint running along the length of the chamber. The butt joint is electric-arc welded along each side of the same, there being only partial penetration by each weld thereby avoiding the filling in of any of the cooling fluid holes, in the line of the weld, with melted material.

4 Claims, 4 Drawing Figures

U.S. Patent  Jul. 21, 1981  4,280,040
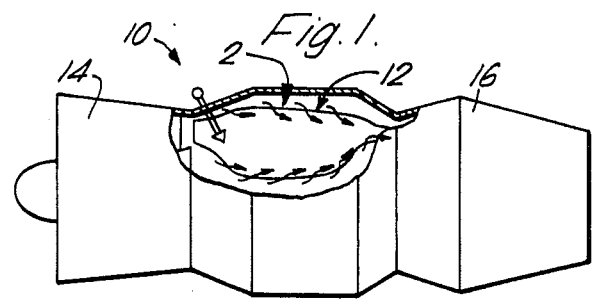
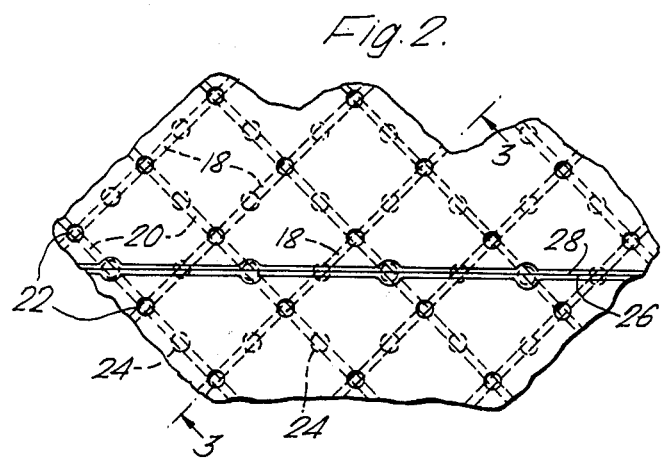
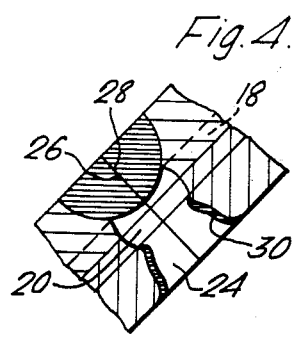
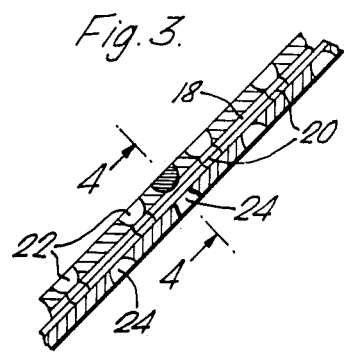

METHOD OF ARC WELDING POROUS SHEET METAL

This invention relates to butt welding porous metal.

The invention is particularly applicable, though not restrictively so, in the manufacture of a combustion chamber for a gas turbine engine.

It is known to manufacture a combustion chamber for a gas turbine engine, from a porous metal structure i.e. metal structure formed from two or more sheets through the thickness of which, by virtue of the existence of holes machined therein, a cooling fluid can flow. The reason for using a porous metal structure as defined, is to permit the flow of cooling fluid through it across a large portion of its surface area, so as to cool the interior surface of the combustion chamber, during its operation in an associated gas turbine engine.

Present butt welding practice, which involves achieving the weld by applying it to one side of the structure only, has proved to have draw backs in that the metal is subjected to the weld heat for a period of time which results in a large amount of metal being displaced, causing filling of the holes which provide the porosity. Thus the ability to achieve a through flow of cooling air in that area, is lost. Further, the infilling of the holes along the weld line, creates a stiff spine of metal with very different strength characteristics, relative to the remainder of the structure. Consequently, in operation in a highly heated environment, the combustion chamber exhibits differential expansion rates between the spine and the remainder of the material and may consequently fail.

It is an object of the present invention to provide a method of welding the abutting edges of porous sheet, metal material such that the porosity of the sheet is unimpaired, nor is a relatively stiff spine created.

According to the present invention, there is provided a method of butt welding the edges of porous sheet metal material as defined herein including the steps of welding the material on both sides, using a power setting on the welding machine and a speed of relative movement between material and welding machine electrode, such that metal is melted on each side of the material, to a depth of not more than half the material thickness.

The invention will now be described, by way of example and with reference to the accompanying drawings in which;

FIG. 1 is a diagrammatic view of a gas turbine engine including a combustion chamber constructed in accordance with the invention, FIG. 2 is an enlarged view on arrow 2 in FIG. 1, FIG. 3 is a developed view in line 3—3 of FIG. 2, FIG. 4 is an enlarged view on line 4—4 of FIG. 3.

In FIG. 1 a gas turbine engine 10 has a combustion chamber 12 situated in known manner, between a compressor 14 and expansion turbine 16.

Combustion chamber 10 is constructed from a sheet metal structure 12 having intersecting passages 18, 20 (FIG. 2) through its length and breadth. Holes 22 and 24 on opposite sides of the structure break into the passages 18, 20 respectively. The holes on one side of the structure are offset relative to the holes on the other side of the structure so that in operation of the combustion chamber, air entering from one side must travel along at least a portion of a passage, before exit from holes in the other side. Thus in effect the sheet is porous.

Though producing the porosity in the sheet forms no part of the present invention, one method will be described hereafter for convenience.

The sheet of the present example is produced by machining intersecting channels in one side only of each of two sheets, machining the holes 22-24 through the sheets, such that the holes connect the channels floors and the unmachined sides of the sheets, then joining the two sheets e.g. by bonding using any suitable technique, with those sides containing the channels engaging each other, so that the channels combine to form the passages 18, 20.

The porous sheet having been made, it is then according to the present example of the invention, formed into a cylinder with two of its opposite edges 26, 28 abutting each other. The cylinder is supported in a suitable jig and the electrode of a tungsten/inert gas welding machine aligned with the interface of the two edges. The electrical power of the machine is adjusted so as to generate an arc across electrode and workpiece to effect the weld. The workpiece is simultaneously moved relative to the electrode, so that the full length of the abutment interface is progressively aligned with the electrode.

The outer surface of the cylinder is welded first, to avoid having to both hold the abutting edges together and weld internally.

That welding current is selected, which will bring about fusion of the metal sheet, for up to half its thickness and without closing the holes 22, 24 having regard to the speed of movement of the cylinder past the electrode.

When the outside of the cylinder has been welded, the inside is welded in similar manner, also without closure of any holes 22, 24. It has been discovered during experiments that the sheet edges are drawn closer together by the welding of the outer surface and this has the effect of presenting to the electrode, an interface which is more akin to solid metal. In consequence, it was found that a higher amperage had to be used to weld the inner side of the cylinder, in order to achieve a weld depth similar to that of the outer weld.

The following parameters were used in a successful experiment whereby a sheet was made and cylinder formed from it as described hereinbefore.

Material Nickel based alloy
Total thickness: 0.056"
Traverse speed: 5" per minute
Amperage:
pulsed at 2.7 pulses per second
from 10 to 35 amps for outer weld
from 10 to 39 amps for inner weld
Weld depth each side: approximately 40% of total sheet thickness.

In this particular example, the parameters disclosed herein enabled a weld to be produced, which merely rounded off the edge of those holes which lay in its path as indicated by the numeral 30 in FIG. 4 and moreover, produced a weld bead which was approximately 60% narrower than that produced by welding from one side only. Further, when the weld so made was subjected to a tensile test, it maintained its integrity. However, the sheet failed elsewhere, on a line joined by a plurality of holes. This implies that, to make the tensile strength more consistent across the sheet, the weld depth could be reduced, although it is the ultimate aim to weld the joint, for the full thickness of the metal, yet still maintain clear holes.

I claim:

1. A method of butt welding together two edges of a porous sheet metal material having holes therein opening to each surface thereof by an electric arc welding process including the steps of:

positioning the two edges to be welded in abutting relationship to form a butt joint running along the two edges, the butt joint having inside and outside surfaces;

first welding, from one of the inside or outside surfaces, along the butt joint with an electric arc welding apparatus having a welding electrode using an amperage and a speed of relative movement between the material and the welding electrode causing the metal material to melt to a depth of not more than half of the material thickness with the holes opening to each surface, in the line of the weld, remaining open after welding; and second welding, from the other of the inside or outside surfaces, along the butt joint with the electric arc welding apparatus using an amperage and a speed of relative movement between the material and the welding electrode causing the metal material to melt to a depth of not more than half the material thickness with the holes opening to each surface, in the line of the weld, remaining open after welding.

2. A method of butt welding together two edges of a porous sheet metal material having holes therein opening to each surface thereof by an electric arc welding process including the steps of:

positioning the two edges to be welded in abutting relationship to form a butt joint running along the two edges, the butt joint having inside and outside surfaces;

first welding, from one of the inside or outside surfaces, along the butt joint with an electric arc welding apparatus having a welding electrode using an amperage and a speed of relative movement between the material and the welding electrode causing the metal material to melt to a depth of not more than half of the material thickness with the holes opening to each surface, in the line of the weld, remaining open after welding; and second welding, from the other of the inside or outside surfaces, along the butt joint with the electric arc welding apparatus using a higher amperage than was used in the first welding step and using a speed of relative movement between the material and the welding electrode causing the metal material to melt to a depth of not more than half the material thickness with the holes opening to each surface, in the line of the weld, remaining open after welding.

3. A method for manufacturing a combustion chamber suitable for use in a gas turbine engine, from a porous sheet metal material having holes therein opening in each surface thereof by an electric arc welding process including the steps of:

bending the porous metal sheet into a cylinder having inside and outside surfaces and abutting edges forming a butt joint running along the abutting edges;

first welding, from one of the inside or outside surfaces, along the butt joint with an electric arc welding apparatus having a welding electrode using an amperage and a speed of relative movement between the material and the welding electrode causing the metal material to melt to a depth of not more than half of the material thickness with the holes opening to each surface, in the line of the weld, remaining open after welding; and second welding, from the other of the inside or outside surfaces, along the butt joint with the electric arc welding apparatus using an amperage and a speed of relative movement between the material and the welding electrode causing the metal material to melt to a depth of not more than half the material thickness with the holes opening to each surface, in the line of the weld, remaining open after welding.

4. A method for manufacturing a combustion chamber suitable for use in a gas turbine engine, from a porous sheet metal material having holes therein opening to each surface thereof by an electric arc welding process including the steps of:

bending the porous metal sheet into a cylinder having inside and outside surfaces and abutting edges forming a butt joint running along the abutting edges;

first welding, from one of the inside or outside surfaces, along the butt joint with an electric arc welding apparatus having a welding electrode using an amperage and a speed of relative movement between the material and the welding electrode causing the metal material to melt to a depth of not more than half of the material thickness with the holes opening to each surface, in the line of the weld, remaining open after welding; and second welding, from the other of the inside or outside surfaces, along the butt joint with the electric arc welding apparatus using a higher amperage than was used in the first welding step and using a speed of relative movement between the material and the welding electrode causing the metal material to melt to a depth of not more than half the material thickness with the holes opening to each surface, in the line of the weld, remaining open after welding.

* * * * *